Figure 1:
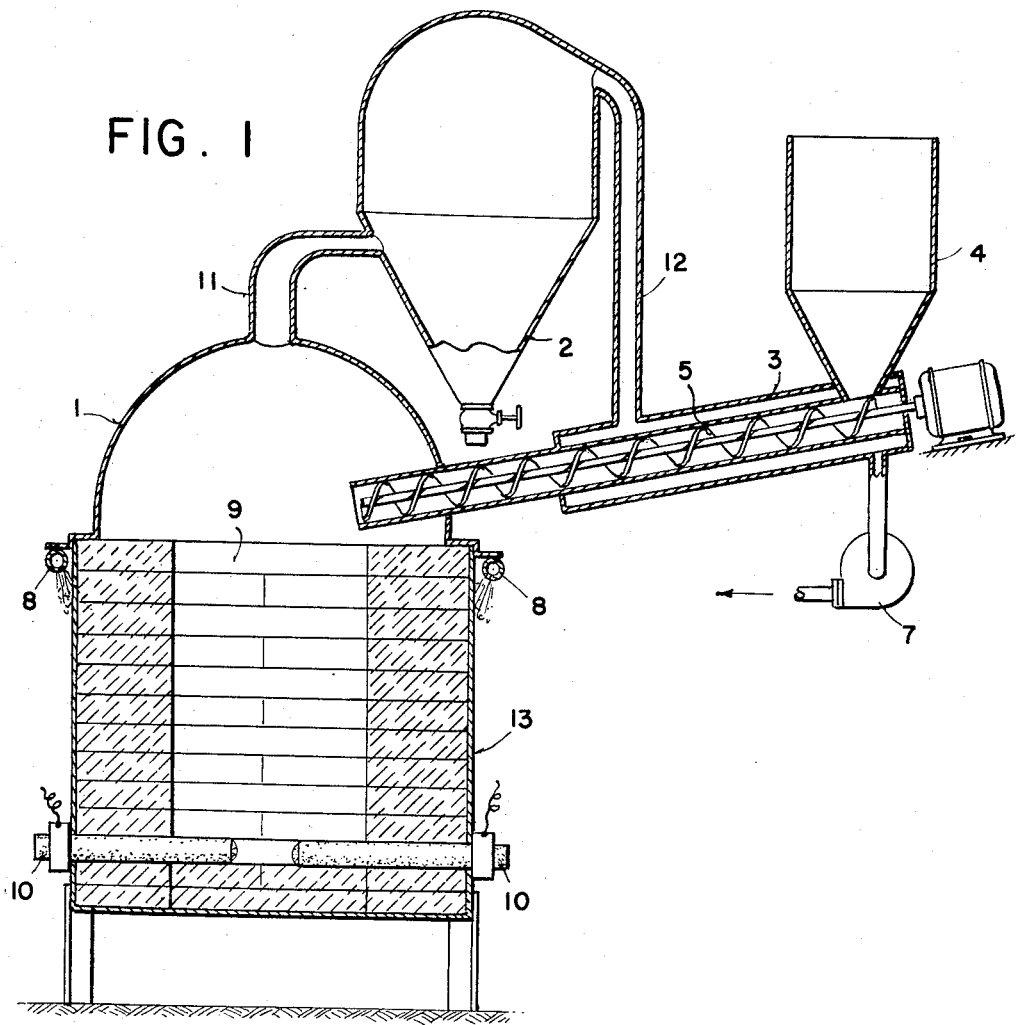

Oct. 6, 1959

J. H. BLACK 2,907,651

PROCESS FOR THE ECONOMIC UTILIZATION OF
WASTE CARBONACEOUS MATERIAL OF FUEL
ASHES AND THE RESULTING PRODUCTS

Filed Sept. 21, 1954

JAMES H. BLACK
INVENTOR

BY Wenderoth, Lind & Ponack

ATTORNEYS

United States Patent Office 2,907,651
Patented Oct. 6, 1959

2,907,651

PROCESS FOR THE ECONOMIC UTILIZATION OF WASTE CARBONACEOUS MATERIAL OF FUEL ASHES, AND THE RESULTING PRODUCTS

James H. Black, Pittsburgh, Pa., assignor, by mesne assignments, to Reading Anthracite Company, Pottsville, Pa., a corporation of Pennsylvania Application September 21, 1954, Serial No. 457,501

22 Claims. (Cl. 75—10)

The present invention relates to process and apparatus for the economic utilization of fuel ashes—more particularly, ashes or clinker recovered from the burning of bituminous coal, lignite or anthracite—and of waste carbonaceous materials—more particularly, coal waste, coal-washery refuse or other mineral wastes associated with coal operation, as well as the waste or tailings from oil shale retorting operations—which are ordinarily considered worthless either as raw material or as fuel.

The technical utilization of such waste material for the production of valuable products is a manifest desideratum in the art, and it is the primary object of this invention to satisfy such desideratum.

This object is realized according to the present invention, briefly stated, by the expedient of utilizing the metal values in the ashes or clinker for the production of valuable alloys and by utilizing the carbon values in the waste carbonaceous materials as reducing agent for recovering such metal values. The respective materials—ashes or clinker and waste carbonaceous materials—are to this end subjected to an electric arc treatment in an electric furnace, as hereinafter described in greater detail.

Auxiliary aspects of the invention involve not only the production of valuable alloys—to which end, if necessary and/or desired, supplemental alloying ore additions may be included in the electric furnace charge—but also the production of articles such for example as turbine parts, varistors, etc. from such alloys, and also the utilization of the slag from the electric arc treatment for abrasive purposes (abrasive powder) and for the production of abrasive articles such for example as abrasive paper, grinding wheels, etc.

The invention thus relates to an electric arc treatment of ash or clinker, after the manner herebefore briefly outlined and hereinafter described in detail, to produce—when no added ore is employed—new and useful alloys containing about 39 to about 68% by weight of silicon, about 24 to about 47% by weight of iron and about 8 to about 14% by weight of titanium and to recover as a by-product a crystalline abrasive containing about 35 to 40% by weight of silicon carbide, about 25 to 30% by weight of mullite and about 30 to 40% by weight of beta cristobalite, in which the discontinuous phase, silicon carbide, is embedded in a matrix of mullite and silicon (cristobalite) dioxide.

The invention also relates to the above silicon-iron-titanium alloys modified with one or more of chromium, nickel, cobalt, copper, calcium, magnesium, manganese, tungsten, vanadium and molybdenum, these additions being achieved by adding a corresponding ore to the ash charge to adjust the amount of alloy addition to from about 5% to about 20% by weight of one or more of these additional alloying ingredients and thereby adjusting downwardly in a corresponding amount the content of silicon, iron and titanium towards the lower part of the range.

The process of the present invention reduces the mineral oxide constituents in waste material such as anthracite, lignite or bituminous coal ash or clinker, coal waste, coal-washery refuse or other mineral wastes associated with coal operation and the waste or tailings from oil shale retorting operations, under temperatures ranging from about 1700° C. to about 2200° C. in an electric arc furnace, preferably of the submerged type, the temperature of the arc being about 3500° C. to about 4000° C., whereby the oxides of carbon, silicon monoxide and aluminum vapor are evolved and led off from the furnace in the vapor state, the above mentioned alloy is tapped from the liquid and the above mentioned abrasive slag is produced as a by-product.

In the production of alloys according to the present invention, it is desirable that additional carbon, such as one or more of carbon black, sawdust, hogged fuel, coal silt and the like be intimately mixed with the waste ash charge in a proportion of from 50% to 90% by weight of the stoichiometric carbon requirement for reduction and placed in the furnace in order to maintain the molten charge in an expanded physical state during its transition at increasing temperature through the incipient fused state and subsequent liquid states of varying degrees of mushiness and fluidity. The addition of pulverized carbon to the charge physically alters the vitreous wetting characteristics of the slag, prevents inclusions of alloying slag occlusions, and permits the coalescing of the alloy globules into a homogeneous lower liquid alloy phase. Best operating characteristics in the furnace are obtained when using 75% by weight of the stoichiometric quantity of carbon required to remove the combined oxygen in the ash.

Particularly preferred is the addition of sawdust, hogged fuel or wood chips which may vary from about 50 mesh (0.0117 inch) with fine sawdust to about 3 inches for hogged fuel. The various sizes of the woody or fibrous cellulosic addition appear to make little difference in the improvement obtained during the electric arc treatment. Without such addition, however, the slag formed during the incipient fused and liquid transitions in the furnace is so highly viscous as to preclude recovery of either the alloy in any practical amount or to permit removing the abrasive by-product.

Another object of the invention is to provide an apparatus for the electric arc treatment of ash wherein a worm conveyer feeds the materials of the charge into a submerged electric arc furnace, said worm conveyer being provided with a heat exchanger, a separator above said furnace to condense oxides of silicon and aluminum evolved in said furnace, said separator being provided with cooling means, if necessary, and a conduit to said heat exchanger for preheating the ash-sawdust mix and the condensed vapors in said separator, electrodes in said furnace for providing a submerged arc to reduce said ash to its alloy constituents and an abrasive by-product and cooling means to cool the outside of said furnace.

A further object of the invention is to provide a method for the electrothermal arc treatment of coal waste and the like comprising introducing a mixture of a comminuted carbonaceous supplement and coal waste containing mineral oxides of which silica, alumina, iron oxide and titanium dioxide are the principal oxides present, into an electric arc at a temperature of about 2800° C. or higher, said carbonaceous supplement being present in an amount sufficient for reduction purposes and to maintain the charge in porous condition and to prevent the coalescing of the slag formed during the liquefaction of the slag whereby an alloy of silicon, iron and titanium is recovered and an abrasive crystalline by-product is produced.

A further object of the invention is to manufacture an alloy containing about 39 to 68% by weight of silicon, about 24 to 47% by weight of iron and about 8 to 14% by weight of titanium and comprising aluminum and carbon in an amount less than 0.1% by weight.

A further object of the invention is to provide, through suitable mineral oxide additions to the waste ash-carbonaceous supplement charged into the electric arc furnace according to this invention, new alloys of silicon, iron, titanium and chrominum, in which the silicon content may vary from 37 to 47% by weight, the iron content may vary from about 25 to 50% by weight, the chromium content may vary from about 4% to about 14% by weight, and the titanium content may vary from about 7 to 12% by weight, the remaining metal impurities being present in an amount less than about 2% by weight and being derived from the ash.

A further object of the invention is to provide, through suitable mineral oxide additions to the waste ash-carbonaceous supplement charged into the electric arc furnace according to this invention, new alloys of silicon, iron, titanium and nickel, in which the silicon content may vary from 37 to 47% by weight, the iron content may vary from about 25 to 50% by weight, the nickel content may vary from about 4% to about 14% by weight, and the titanium content may vary from about 7 to 12% by weight, the remaining metal impurities being present in an amount less than about 2% by weight and being derived from the ash.

A further object of the invention is to provide, through suitable mineral oxide additions to the waste ash-carbonaceous supplement charged into the electric arc furnace according to this invention, new alloys of silicon, iron, titanium and cobalt, in which the silicon content may vary from 37 to 47% by weight, the iron content may vary from about 25 to 50% by weight, the cobalt content may vary from about 4% to about 14% by weight, and the titanium content may vary from about 7 to 12% by weight, the remaining metal impurities being present in an amount less than about 2% by weight and being derived from the ash.

A further object of the invention is to provide, through suitable mineral oxide additions to the waste ash-carbonaceous supplement charged into the electric arc furnace according to this invention, new alloys of silicon, iron, titanium and tungsten, in which the silicon content may vary from 37 to 47% by weight, the iron content may vary from about 25 to 50% by weight, the tungsten content may vary from about 4% to about 14% by weight, and the titanium content may vary from about 7 to 12% by weight, the remaining metal impurities being present in an amount less than about 2% by weight and being derived from the ash.

A further object of the invention is to provide, through suitable mineral oxide additions to the waste ash-carbonaceous supplement charged into the electric arc furnace according to this invention, new alloys of silicon, iron, titanium and manganese, in which the silicon content may vary from 37 to 47% by weight, the iron content may vary from about 25 to 50% by weight, the manganese content may vary from about 4% to about 14% by weight, and the titanium content may vary from about 7 to 12% by weight, the remaining metal impurities being present in an amount less than about 2% by weight and being derived from the ash.

Another object of the invention is to provide a crystalline abrasive recovered from the electrothermal arc treatment of coal waste and an associated combustible carbon supplement, said abrasive containing about 35 to 40% by weight of silicon carbide, about 25 to 30% by weight of mullite and about 30 to 40% by weight of beta cristobalite or other high temperature modification of silica.

Other and further objects of the present invention will appear from the more detailed description set forth below, it being understood that such detailed description is given by way of illustration and explanation only and not by way of limitation, since various changes therein may be made by those skilled in the art without departing from the scope and spirit of the present invention.

Figure 2:
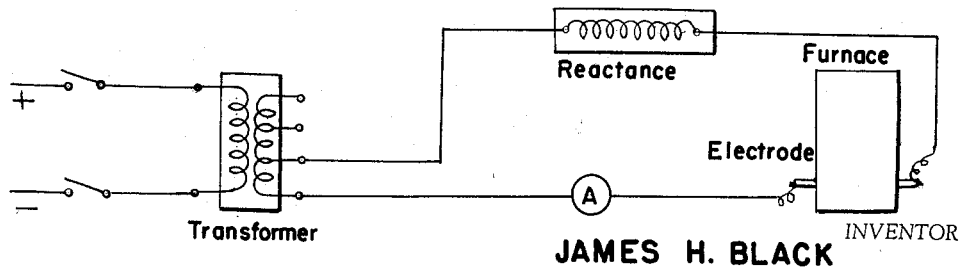

In connection with that more detailed description, there is shown in the drawings, in Fig. 1, a view partly in section and partly in elevation of the submerged arc furnace in accordance with the invention; and in Fig. 2, the circuit diagram for the electrodes of the furnace.

In Fig. 1 there is shown a furnace which may e.g. be of rectangular cross-section in which hood 1 is fitted with a sprinkling device or water spray 8 which delivers a cooling fluid such as water to the outer sides of the furnace for proper control of the outside temperature and to prevent excessive heating along the vertical brick lining 9. The graphite electrodes 10 are adjustably mounted at the side of the furnace and provide the proper gap for control of the arc. The furnace is charged from the top through a screw charging conveyor 5 which delivers an intimate mixture of ash and sawdust to the interior of the furnace, or ash, sawdust and an ore addition, charged from feet bin 4.

If the furnace has a carbon brick floor, this may serve as one electrode, while one graphite rod 10 serves as the other electrode.

The addition of supplemental oxides or ore addition is also made through the screw feed 5 and there is provided a heat exchanger 3 for preheating the addition which is made. The addition may also be an alloy such as ferrochrome or the like, if desired.

Waste gases are eliminated through pipe 11, and a separator 2 is used to condense aluminum and other vapors. The waste gases after separation of the aluminum are recycled through tube 12 to preheat the additions made in conveyer 5.

Blower 7 serves to exhaust the heat exchange gases from the separator 2, conduit 12, and heat exchanger 3 and is likewise useful, if desired, for auxiliary cooling of the furnace where it is of advantage to augment the cooling which is afforded by the use of the water spray 8. A steel shell 13 assures proper mechanical support for the brick lining 9 and withstands the variations in the temperature encountered during the operation of the furnace.

In Fig. 2 the relatively simple circuit of current source, transformer, and reactance is shown whereby the arc from graphite electrode is maintained at the proper temperature.

Operation of the apparatus is essentially self-explanatory. The material constituting the charge (and which may comprise ash, clinker, waste carbonaceous material, added waste carbonaceous material and/or added ore) is supplied via bin 4 and conveyer 5. The conversion to alloy and clinker takes place at the bottom of the furnace at the arc. Suitable tapping openings (not shown) are provided for withdrawing the molten alloy and slag, respectively.

The following examples are based, by way of illustration, upon anthracite ash. The same results are obtained using lignite ash or bituminous coal ash or clinkers of these fuels or the refuse or tailings from oil shale retorting operations or coal mine refuse of high mineral oxide content which is worthless as a fuel.

EXAMPLE 1

A charge is prepared, as shown below, from the ash or clinker from steam size anthracite or burning bank anthracite, in the following proportions, and is added to the furnace where it is subjected for a period of about 6 hours to the electric arc treatment in the particular furnace employed:

| | Parts by weight |
|---|---|
| Anthracite ash | 3000 |
| Anthracite silt | 336 |
| Sawdust | 1125 |
| Total weight of charge | 4461 |

The following are the ranges of the constituents determined on the clinker or ash in the furnace from twelve samples of commercial steam size anthracite, used in charges according to the preceding paragraph:

| Constituents: | Percent by weight |
|---|---|
| Silica ($SiO_2$) | 43.5–75.2 |
| Alumina ($Al_2O_3$) | 23.0–35.7 |
| Iron oxide ($Fe_2O_3$) | 3.0–5.0 |
| Titanium dioxide ($TiO_2$) | 2.0–1.6 |
| Magnesium oxide (MgO) | 0.8–0.6 |
| Calcium oxide (CaO) | 0.4–0.2 |
| Manganese oxide (MnO) | 0.008–0.006 |
| Vanadium oxide ($V_2O_5$) | 0.04–0.02 |
| Germanium oxide (GeO) | 0.01–trace |
| Arsenic (As) | 0.01–0 |
| Copper (Cu) | 0.01 |
| Chromium (Cr) | 0.01 |
| Bismuth (Bi) | 0 |
| Lead (Pb) | 0.01 |
| Lithium (Li) | 0.01 |

The following are similar analyses for six burning bank ash samples:

| Constituents: | Percent by weight |
|---|---|
| Silica ($SiO_2$) | 46.3–64.4 |
| Alumina ($Al_2O_3$) | 18.7–31.8 |
| Iron oxide ($Fe_2O_3$) | 3.8–5.6 |
| Titanium dioxide ($TiO_2$) | 1.8–1.5 |
| Magnesium oxide (MgO) | 0.9–0.4 |
| Calcium oxide (CaO) | 0.25–0.20 |
| Manganese oxide (MnO) | 0.008 |
| Germanium oxide (GeO) | trace |
| Vanadium oxide ($V_2O_5$) | 0.03–0.02 |

The alloys obtained from the aforesaid eighteen ashes have the following composition, on a weight basis:

| | Percent |
|---|---|
| Silicon | 39–68 |
| Iron | 24–47 |
| Titanium | 8–14 |
| Aluminum, cobalt, copper, manganese, nickel, vanadium and magnesium | 2 |

The by-products from the furnace noted in the separator are: carbon monoxide, carbon dioxide, silicon monoxide, and aluminum in the vapor phase. A slag containing silicon carbide, mullite and beta cristobalite is recovered.

The slag is useful as a crystalline abrasive and contains silicon carbide as the discontinuous phase which is embedded in a matrix of mullite and silicon dioxide.

The continuous phase present has a hardness between 9 and 9.5 on the Moh's hardness scale, while the discontinuous phases have a hardness of 9.5–10 on the same scale. X-ray and spectrographic analyses of the slag show that the abrasive product is approximately 100 percent crystalline and that it consists of about 35–40 percent by weight of silicon carbide (SiC), about 25–30 percent by weight of mullite ($3Al_2O_3.2SiO_2$), and about 30–40 percent by weight of beta cristobalite ($SiO_2$) or some closely equivalent high temperature modification of silica. The variations in silica content are a result of differences in silica content in the original ash.

The slag can be ground to any desired particle size, depending upon what roughness is required or desired for the product. The ground slag may be used to make abrasive paper, grinding wheels, or abrasive powder.

The temperature in the arc is about 3500° C., decreasing to about 1600° C. at the furnace walls. The temperature of the alloy averages about 1800° C. when tapped from the furnace, and the slag averages about 2100° C.

Recoveries of about 340 pounds of alloy per ton of ash are obtained in the above example using a larger commercial furnace. The yields in the smaller furnaces are slightly lower because of the proportionately greater heat loses in smaller furnaces.

In the commercial-sized, submerged-arc furnace the consumption of electricity is about 6 kilowatt hours per pound of alloy. Although the cost of this power varies somewhat with the location of the plant and the billing demand, electricity usually costs between $0.005 and $0.025 per kilowatt hour so that the power cost is surprisingly low.

EXAMPLE 2

The electric arc treatment is repeated as in Example 1, using an ash of the following analysis:

| | Percent by weight |
|---|---|
| Silica | 54.0 |
| Iron oxide | 5.9 |
| Alumina | 32.3 |
| Titanium oxide | 1.8 |
| Calcium oxide | 0.9 |
| Magnesium oxide | 1.2 |
| Sulfuric anhydride | 0.4 |
| $Na_2O+K_2O$ | 3.5 |

The charge is made up in the following proportions and added to the furnace:

| | Parts by weight |
|---|---|
| Anthracite ash | 3000 |
| Anthracite silt | 336 |
| Sawdust | 1125 |
| Total weight of charge | 4461 |

The composition of the alloy produced is as follows:

| | Percent by weight |
|---|---|
| Silicon | 55.74 |
| Iron | 28.87 |
| Titanium | 10.95 |
| Aluminum | 0.1–1.0 |
| Phosphorus | 0.128 |
| Carbon | 0.10 |
| Sulfur | 0.011 |
| Cobalt, copper, manganese, nickel vanadium, zirconium, each | 0.01–0.1 |
| Magnesium | 0.001–0.01 |

It is understood that the term ash includes both ash and clinker, which usually contain 10–20 percent by weight of unburned carbon. While this refuse is suitable for this process as is, it is more desirable to use ash or clinker containing no unburned carbon as a raw material so that the carbon requirement can be added more accurately.

Anthracite ash is obtained, as is known, also from anthracite culm, bone coal, slush, or silt, all waste products of anthracite preparations.

The alloy prepared in this example contains a significant amount of aluminum and can be used as a deoxidizing agent. A specific example of such a use is as a "getter" in electron tubes.

The composition can be varied if the charge composition is changed by the addition of mineral oxides such as sand, bauxite, ilmenite, rutile, clay or iron ore. It can also be varied by changing the length of time the molten product is held in the furnace. A longer holding-time results in boiling out aluminum and silicon, principally aluminum. If an alloy high in aluminum is desired, bauxite is mixed with the charge and the holding-time may be correspondingly reduced, e.g. to a period as short as 15 minutes. This results in a greater concentration of aluminum in the finished product than would obtain if just anthracite ash were used. Addition of iron ore increases the iron content, addition of ilmenite or rutile increases the titanium content, addition of sand increases the silicon content and the addition of clay increases the aluminum and silicon content. Combinations of any or all of these additions are readily realized in terms of correspondingly changed alloys.

An important feature of the alloy is that it contains three powerful deoxidizers, silicon, titanium and aluminum, and that it also contains low concentrations of the undesirable elements sulfur, phosphorus and carbon.

EXAMPLE 3

The electric arc treatment of ash is repeated as in Example 1, using a typical ash from bituminous coal.

The typical bituminous coal ash has the following composition:

| | Percent by weight |
|---|---|
| $SiO_2$ | 58.5 |
| $Al_2O$ | 30.6 |
| $Fe_2O_3$ | 4.2 |
| $TiO_2$ | 1.8 |
| CaO | 2.0 |
| MgO | 0.4 |
| $Na_2O$ | 0.7 |
| $K_2O$ | 0.9 |
| $SO_3$ | 0.9 |

The charge to the furnace in parts by weight is:

| | Parts |
|---|---|
| Bituminous coal ash | 3000 |
| Anthracite silt | 393 |
| Sawdust | 1108 |
| Total weight of charge | 4501 |

The analysis of the recovered alloy is as follows:

*Alloy analysis*

| | Percent by weight |
|---|---|
| Silicon | 62.43 |
| Iron | 25.55 |
| Titanium | 10.95 |
| Traces of seven other metals (Al, Co, Cu, Mn, Ni, Mg and V) | 1.07 |

In contrast to the alloys recovered in Examples 1 and 2, it appears to be easier to remove aluminum in the form of vapor during the electrothermal treatment in the case of bituminous coal ash whereby the silicon content is slightly higher and the iron content is slightly lower than in the alloys of these preceding examples.

Bituminous coal ash is obtained, as is known, also from bituminous gob, slush, or fines, all waste products of bituminous coal preparation.

EXAMPLE 4

The electric arc treatment is repeated as in Example 1 except that the addition of an alloying ore, a chromium oxide, specifically is studied by the addition of technical chromic sesquioxide to the charge.

A charge for the arc furnace is mixed in the following proportions:

| | Parts by weight |
|---|---|
| Anthracite ash as in Example 1 | 3000 |
| Technical chromic sesquioxide | 77 |
| Anthracite silt | 343 |
| Sawdust | 1144 |
| Total weight of charge | 4564 |

An arc is struck in the furnace and then the charge is gradually added. After 1½ hours of operation, the furnace is shut-off.

The alloy obtained from this charge has the following composition:

| | Percent by weight |
|---|---|
| Silicon | 40.68 |
| Iron | 44.44 |
| Chromium | 4.78 |
| Titanium | 8.67 |
| Traces of seven other metals (Al, Co, Cu, Mn, Ni, V and Mg) | 1.43 |

This example shows that by adding about 2.5% by weight of chromic oxide to the ash charge, an alloy is produced which contains almost 5% by weight of chromium and a recovery of about 50% of the chromium.

EXAMPLE 5

This example also illustrates the addition of an alloying ore and adds nickel and is carried out under the same conditions as Example 4. The pertinent data are summarized as follows:

*Nickel oxide addition*

| | Parts by weight |
|---|---|
| Anthracite ash | 3000 |
| Nickel oxide (NiO) [1] | 114 |
| Anthracite silt | 343 |
| Sawdust | 1144 |
| Total weight of charge | 4601 |

[1] About 4% NiO by weight added to the ash.

*Resultant alloy analysis*

| | Percent by weight |
|---|---|
| Silicon | 39.31 |
| Iron | 43.00 |
| Nickel | 7.93 |
| Titanium | 8.38 |
| Traces of seven other metals (Al, Cu, Mn, V, Zr, Mg, Co, etc.) | 1.38 |

X-ray analysis of the slag recovered by the electric arc treatment of this example shows, surprisingly, that the slag still consists of silicon carbide, silica and mullite as is observed in Examples 1–3 inclusive. The addition of the above oxide does not alter the slag composition noticeably. Petrographic inspection of the slag shows that the discontinuous phase is silicon carbide which is embedded in a continuous matrix of mullite and silica as in the slags of Examples 1–3 inclusive.

The alloy from this example is suitable as a catalyst for hydrocarbon synthesis reactions. The catalyst can be prepared either by the method of Raney (U.S. Patent 1,628,190), or by powder methods involving sintering (Bozorth, R. M., "Ferromagnetism," D. Von Nostrand Co., 1951).

EXAMPLE 6

This example also illustrates the addition of alloying ore and adds copper and is carried out under the same conditions as Example 4. The pertinent data are summarized as follows:

*Copper oxide addition*

| | Parts by weight |
|---|---|
| Anthracite ash | 3000 |
| Copper oxide (CuO) [1] | 121 |
| Anthracite silt | 343 |
| Sawdust | 1144 |
| Total weight of charge | 4608 |

[1] About 4% CuO by weight added to the ash.

*Alloy analysis*

| | Percent by weight |
|---|---|
| Silicon | 39.6 |
| Iron | 42.72 |
| Copper | 8.53 |
| Titanium | 8.32 |
| Traces of seven other metals as in Example 5 | 1.37 |

EXAMPLE 7

This example also illustrates the addition of alloying ore and adds manganese and is carried out under the same conditions as Example 4. The pertinent data are summarized as follows:

*Manganese dioxide addition*

| | Parts by weight |
|---|---|
| Anthracite ash | 3000 |
| Manganese dioxide [1] | 180 |
| Anthracite silt | 350 |
| Sawdust | 1163 |
| Total weight of charge | 4693 |

[1] About 6% $MnO_2$ by weight added to the ash.

Alloy analysis

| | Percent by weight |
|---|---|
| Silicon | 40.46 |
| Iron | 44.32 |
| Manganese | 5.18 |
| Titanium | 8.62 |
| Traces of seven other metals as in Example 5 | 1.42 |

EXAMPLE 8

This example also illustrates the addition of alloying ore and adds vanadium and is carried out under the same conditions as Example 4. The pertinent data are summarized as follows:

Vanadium oxide addition

| | Parts by weight |
|---|---|
| Anthracite ash | 3000 |
| Vanadium pentoxide [1] | 111 |
| Anthracite silt | 350 |
| Sawdust | 1163 |
| Total weight of charge | 4624 |

[1] About 4% $V_2O_5$ by weight added to the ash.

Alloy analysis

| | Percent by weight |
|---|---|
| Silicon | 40.26 |
| Iron | 44.08 |
| Vanadium | 5.66 |
| Titanium | 8.58 |
| Traces of seven other metals as in Example 5 | 1.42 |

X-ray analysis of the slag recovered by the electric arc treatment of each of Example 6 to 8 inclusive shows, surprisingly, that the slag still consists of silicon carbide, silica and mullite as is observed in Examples 1-3 inclusive. The addition of the oxide does not alter the slag composition noticeably. Petrographic inspection of the slag shows that the discontinuous phase is silicon carbide which is embedded in a continuous matrix of mullite and silica as in the slags of Examples 1-3 inclusive.

EXAMPLE 9

This example illustrates the addition of alloying ore and adds tungsten and is carried out under the same conditions as Example 4. The pertinent data are summarized as follows:

Tungsten oxide addition

| | Parts by weight |
|---|---|
| Anthracite ash | 3000 |
| Tungsten oxide [1] | 235 |
| Anthracite silt | 350 |
| Sawdust | 1163 |
| Total weight of charge | 4748 |

[1] About 7.83% $WO_3$ by weight added to the ash.

Alloy analysis

| | Percent by weight |
|---|---|
| Silicon | 40.3 |
| Iron | 44.1 |
| Tungsten | 5.7 |
| Titanium | 8.6 |
| Traces of seven other metals (Al, Co, Cu, Mn, Ni, Mg, and V) | 1.3 |

X-ray analysis of the slag recovered by the electric arc treatment of this example shows that the slag still consists of silicon carbide, silica and mullite as is observed in Examples 1-3 inclusive. The addition of the above oxide does not alter the slag composition noticeably. Petrographic inspection of the slag shows that the discontinuous phase is silicon carbide which is embedded in a continuous matrix of mullite and silica as in the slags of Examples 1-3 inclusive.

EXAMPLE 10

The slag from Example 1 is treated in the following manner.

About 25 parts of slag of Example 1 is ground to minus 50 mesh and sprinkled over adhesive paper on which glue has been spread. After the glue has dried, the abrasive paper is used to abrade steel and wood with excellent results.

Some of the phases present have a hardness between 9 and 9.5 on the Mohs' hardness scale, while other phases have a hardness of 9.5-10 on the same scale. X-ray and spectrographic analyses of the slag show that the abrasive product is approximately 100% crystalline and that it consists of about 35-40% by weight of silicon carbide (SiC), about 25-30 by weight of mullite ($3Al_2O_3 \cdot 2SiO_2$), and about 30-40% by weight of beta cristobalite ($SiO_2$) or some other high temperature modification of silica.

The glue may for example be a waterprof fish glue, a waterproof marine glue made e.g. of caoutchouc or shellac in turpentine, benzene or the like. Any other suitable and per se conventional glue may also be used.

The slag can be ground to any desired particle size, depending upon what roughness is required or desired for the product. The ground slag may also be used to make grinding wheels, abrasive powder, etc.

EXAMPLE 11

Example 10 is repeated except that instead of glue, a synthetic resin is used, specifically a urea-formaldehyde laminating syrup, being such as is commercially available. For example, Melecol Fix, Melecol H (Ciba), Cosco Syrup, Uformite (Rohm and Haas), Plaskon (Libbey-Owens-Ford), Beetle (American Cyanamid Co.), Beckamine (Reichhold), etc. are trade names of materials which may be used with equally good results in accordance with the foregoing example.

The sandpaper produced is better with respect to the resin binding characteristics than glue in accordance with the specific features of improvement inherently characteristic of the particular urea-formaldehyde resin employed from the commercial source.

Uformite is a urea-formaldehyde resin in water or an organic solvent. Beetle is a thermosetting urea-formaldehyde resin in solution in an organic solvent. Plaskon resin glue is a urea-formaldehyde resin adhesive which is made in hot-setting and cold-setting types; it is available as a dry powder which is mixed with water and an accelerator before use. Beckamine is a solution of urea-formaldehyde in water or blends of toluene, xylene, and butyl and ethyl alcohols.

EXAMPLE 12

The sandpaper of Example 11 is made except that the resin is an epoxy (Epon) resin using, as a curing agent, 6% by weight of dicyanamide and a curing temperature of about 300-350° F. for 30 minutes to several hours. A sandpaper of excellent flexibility is obtained which has excellent abrasive characteristics and long life. The sandpaper is particularly adapted for fitting on wheels and the heat dissipation may be improved by incorporating up to about 15% by weight of carbon black in the liquid resin.

EXAMPLE 13

A sandpaper as in Example 11 is made using Paraplex P13, P43 and P43HV (Rohm and Haas), these resins being polyester-styrene resins which polymerize with peroxide catalysts and/or ultraviolet light to abrasive products of excellent flexibility.

EXAMPLE 14

A sandpaper as in Example 9 is made using Selectron 5000 (Pittsburgh Plate Glass) and an excellent sandpaper is obtained.

Selectron is a clear, transparent, fast-curing, thermosetting, polyester resin of the copolymer type.

EXAMPLE 15

A sandpaper as in Example 10 is made using Laminac 4134 and Laminac 4146 in equal proportions to produce an excellent and fire resistant abrasive.

The Laminacs are reactive thermosetting copolymers in the form of liquids which, with the addition of catalyst and heat, set into flexible state.

EXAMPLE 16

A sandpaper as in Example 15 is made using Polylite 8000, an unsaturated polyester resin which is cured at temperatures up to 250° up to a hour or so in the presence of a peroxide catalyst.

Equally good results are obtained with phenolic resin, e.g. Plyophen (Reichhold) 5013, which is cured at about 285° F.

Particularly valuable improvements are observed by adding up to 25% of silicone resin, Dow Corning DC-2104, to the polyester or phenolic resin.

Also, improvements are observed in the finished product by blending melamine resins, such as Melmac (American Cyanamid) with the urea resins (Uformite) or with the polyester resins such as Polylite, or Laminac.

In known manner, a grinding wheel may be formed as in the case of each of the paper abrasives. Glass fibers which are finely divided may be admixed with conductive carbon to provide 25 to 30% by weight of filler for reinforcing the wheel body. The harder alloys of the foregoing examples, for example the alloy of Example 4 may be ground to about 50 mesh and added to augment abrading action of the wheel and to improve the dissipation of heat during grinding. The same beneficial effect is obtained with the corresponding tungsten alloy as in Example 4 as will be apparent from the foregoing description of the invention. The amount of alloy added is preferably about 25 to 35% by weigh of the total amount of the abrading material and resin.

Resin wheels or blocks formed in the above manner and using reconstituted additions of alloy are of advantage in joining abrading elements to various types of ferrous and non-ferrous bases. For example, the alloy of Example 3 is useful in cementing a high temperature resin modification, such as the silicone modification of an abrading block using the slag of Example 1, to a magnesium aluminum alloy, e.g. ALST-24, and the use to which such fabricated member is put is not necessarily restricted to grinding, since such blocks or bars may be used as anti-friction devices for a great variety of applications.

In general, it is preferred to use thermosetting resins having high resistance to high temperature conditions and these resins may be expanded by using pore-forming agents and reinforced with chopped glass fibers of very short fiber length ($\frac{1}{16}$ inch to $\frac{1}{100}$ inch and less) to obtain maximum strength.

Highly desirable alloy compositions are those in which the metal oxide or ore additive is made in a relatively small proportion so that the concentration of the corresponding metal (chromium for example) is from about 4% to about 14% by weight. There is thereby provided with chromium a product of extremely wide usefulness in the manufacture of ferrous alloys and non-ferrous alloys. For example, magnetic alloy compositions as are set forth in U.S. Patent No. 2,499,861 may be made by the addition of the alloy of the present invention containing cobalt and nickel to a low carbon iron alloy and such ingredients as aluminum contained in such compositions may be added separately.

Alloys such as described in U.S. Patent No. 2,611,710 may be formulated and realized through the use of appropriate ferrochrome, ferromanganese and boron additions.

Hot workable alloys which resist embrittlement upon continued exposure to elevated temperatures and which are required in gas turbines and jet propulsion equipment may be prepared by suitable additions of chromium, nickel, cobalt and tungsten and of smaller amounts of molybdenum. For example, the coal ash may be supplemented with the oxides corresponding to the above alloying elements or, alternatively, these additions may be made in part by the use of ferrochrome and aluminum-chromium-nickel alloys (see U.S. Patent No. 1,633,805), to produce an alloy containing about 25% by weight of silicon, 20% by weight of nickel, 5% by weight of molybdenum, 7% by weight of tungsten, 0.08% by weight of carbon, 5% by weight of titanium and about 0.2% by weight of aluminum, the remainder being iron. Appropriate additions of ferrochrome to this alloy provide a wide variety of alloy products which can be readily fabricated, per se, or can be used as sheet coverings to be welded to a less heat resistant base metal.

Having thus disclosed the invention what is claimed is:

1. A method for producing alloys comprising introducing a mixture of a comminuted carbonaceous supplement and coal ash containing mineral oxides of which silica, alumina, iron oxide and titanium dioxide are the principal oxides present, into an electric arc at a temperature of at least about 2200° C., said carbonaceous supplement being present in an amount of from 50% to 90% by weight of the amount necessary to reduce the oxides, which amount is sufficient to maintain the charge in porous condition and to prevent the coalescing of the slag formed during the liquefaction of the slag and an alloy of 39–68% silicon, 24–47% iron and 8–14% titanium is recovered and an abrasive crystalline by-product, consisting essentially of silicone carbide, mullite and beta cristobalite, is produced.

2. A process as in claim 1 wherein said coal waste as anthracite ash, said carbonaceous supplement is sawdust and said sawdust is present in an amount of 75% of the stoichiometric quantity necessary to reduce the mineral oxides in said anthracite ash.

3. A process as in claim 1 wherein said coal waste is anthracite clinker, said carbonaceous supplement is sawdust and said sawdust is present in an amount of 75% of the stoichiometric quantity necessary to reduce the mineral oxides in said anthracite clinker.

4. A process as in claim 1 wherein said coal waste is bituminous ash, said carbonaceous supplement is sawdust and said sawdust is present in an amount of 75% of the stoichiometric quantity necessary to reduce the mineral oxides in said bituminous ash.

5. A process as in claim 1 wherein said coal waste is bituminous clinker, said carbonaceous supplement is sawdust and said sawdust is present in an amount of 75% of the stoichiometric quantity necessary to reduce the mineral oxides in said bituminous clinker.

6. A process as in claim 1 wherein said coal waste is lignite ash, said carbonaceous supplement is sawdust and said sawdust is present in an amount of 75% of the stoichiometric quantity necessary to reduce the mineral oxides in said lignite ash.

7. A process as in claim 1 wherein said coal waste is oil shale refuse, said carbonaceous supplement is sawdust and said sawdust is present in an amount of 75% of the stoichiometric quantity necessary to reduce the mineral oxides in said oil shale residue.

8. A method for producing alloys of silicon, iron, titanium and an additional alloying ingredient to harden the primary alloy, which comprises introducing said alloying ingredient in the form of an ore into a mixture of a comminuted carbonaceous supplement and coal ash containing mineral oxides of which silica, alumina, iron oxide and titanium dioxide are the principal oxides present, into an electric arc at a temperature of at least about 2800° C., said carbonaceous supplement being present in an amount of from 50% to 90% by weight of the amount necessary to reduce the oxides, which amount is sufficient to maintain the charge in porous condition and to prevent the coalescing of the slag formed during the liquefaction of the slag and a hardened alloy of 39–68% silicon, 24–47% iron and 8–14% titanium is recovered and an abrasive crystalline by-product, consisting essentially of silicon carbide, mullite and beta cristobalite, is produced.

9. A method as in claim 8 wherein said additional alloying ingredient is added in the form of an alloy with iron.

10. A method as in claim 8 wherein said additional alloying ingredient is chromium and said chromium is added in the form of subdivided ferrochrome.

11. A method as in claim 8 wherein said additional alloying ingredient is manganese and said manganese is added in the form of subdivided ferromanganese.

12. A method as in claim 8 wherein said alloy contains about 55–58% by weight of silicon, about 28–33% by weight of iron, about 10–12% by weight of titanium and about 1% by weight of aluminum, the remainder being not more than 1% by weight of carbon, sulfur and phosphorus.

13. A method as in claim 10 wherein said alloy contains silicon, iron, titanium and chromium, in which the silicon content may vary from 39 to 45% by weight, the iron content may vary from about 27 to 47% by weight, the chromium content may vary from about 4% to about 14% by weight, and the titanium content may vary from about 8 to 12% by weight, the remaining metal impurities being present in an amount less than about 2% by weight and being derived from the ash.

14. A method as in claim 8 wherein said alloy contains silicon, iron, titanium and nickel, in which the silicon content may vary from 39 to 45% by weight, the iron content may vary from about 27 to 47% by weight, the nickel content may vary from about 4% to about 14% by weight, and the titanium content may vary from about 8 to 12% by weight, the remaining metal impurities being present in an amount less than about 2% by weight and being derived from the ash.

15. A method as in claim 8 wherein said alloy contains silicon, iron, titanium and tungsten, in which the silicon content may vary from 39 to 45% by weight, the iron content may vary from about 27 to 47% by weight, the tungsten content may vary from about 4% to about 14% by weight, and the titanium content may vary from about 8 to 12% by weight, the remaining metal impurities being present in amount less than about 2% by weight and being derived from the ash.

16. A method as in claim 8 wherein said alloy contains silicon, iron, titanium and cobalt, in which the silicon content may vary from 39 to 45% by weight, the iron content may vary from about 27 to 47% by weight, the cobalt content may vary from about 4% to about 14% by weight, and the titanium content may vary from about 8 to 12% by weight, the remaining metal impurities being present in an amount less than about 2% by weight and being derived from the ash.

17. A method as in claim 8 wherein said alloy contains silicon, iron, titanium and manganese, in which the silicon content may vary from 39 to 45% by weight, the iron content may vary from about 27 to 47% by weight, the manganese content may vary from about 4% to about 14% by weight, and the titanium content may vary from about 8 to 12% by weight, the remaining metal impurities being present in an amount less than 2% by weight and being derived from the ash.

18. A method as in claim 8 wherein said alloy contains silicon, iron, titanium and vanadium, provided through suitable mineral oxide additions to the waste ash-carbonaceous supplement charged in an electric arc furnace, in which the silicon content may vary from 39 to 45% by weight, the iron content may vary from about 27 to 47% by weight, the vanadium content may vary from about 4% to about 14% by weight, and the titanium content may vary from about 8 to 12% by weight, the remaining metal impurities being present in an amount less than about 2% by weight and being derived from the ash.

19. A method as in claim 8 wherein said alloy contains silicon, iron, titanium and molybdenum, in which the silicon content may vary from 39 to 45% by weight, the iron content may vary from about 27 to 47% by weight, the molybdenum content may vary from about 4% to about 14% by weight, and the titanium content may vary from about 8 to 12% by weight, the remaining metal impurities being present in an amount less than about 2% by weight, and being derived from the ash.

20. A method as in claim 8 wherein said alloy contains silicon, iron, titanium and zirconium, in which the silicon content may vary from 39 to 45% by weight, the iron content may vary from about 27 to 47% by weight, the zirconium content may vary from 4% to about 14% by weight, and the titanium content may vary from about 8 to 12% by weight, the remaining metal impurities being present in an amount less than 2% by weight and being derived from the ash.

21. A method as in claim 8 wherein said alloy contains silicon, iron, titanium and beryllium, in which the silicon content may vary from 39 to 45% by weight, the iron content may vary from about 27 to 47% by weight, the beryllium content may vary about 4% to about 14% by weight, and the titanium content may vary from about 8 to 12% by weight, the remaining metal impurities being present in an amount less than 2% by weight and being derived from the ash.

22. A method as in claim 8 wherein said alloy contains silicon, iron, titanium and copper, in which the silicon content may vary from 39 to 45% by weight, the iron content may vary from about 27 to 47% by weight, the copper content may vary from about 4% to about 14% by weight, and the titanium content may vary from about 8 to 12% by weight, the remaining metal impurities being present in an amount less than about 2% by weight and being derived from the ash.

References Cited in the file of this patent

UNITED STATES PATENTS

| Number | Name | Date |
|---|---|---|
| 596,704 | Hartenstein | Jan. 4, 1898 |
| 712,925 | Gin | Nov. 4, 1902 |
| 715,211 | O'Conner | Dec. 2, 1902 |
| 724,524 | Tilden | Apr. 7, 1903 |
| 854,018 | Becket | May 21, 1907 |
| 865,609 | Price | Sept. 10, 1907 |
| 873,328 | Price | Dec. 10, 1907 |
| 1,020,546 | Fleming | Mar. 19, 1912 |
| 1,044,957 | Washburn | Nov. 19, 1912 |
| 1,815,888 | Baily | July 28, 1931 |
| 2,114,160 | Whitacre | Apr. 12, 1938 |
| 2,115,197 | Edwards | Apr. 26, 1938 |
| 2,468,654 | Brundell et al. | Apr. 26, 1949 |
| 2,562,543 | Gippert | July 31, 1951 |
| 2,639,232 | Vignos | May 19, 1953 |
| 2,662,010 | Ahles | Dec. 8, 1953 |

OTHER REFERENCES

Mining Engineering, August 1953 (page 782 relied on).
Headlee: Mining Engineering, October 1953, pages 1011–1014 (page 1012, Table I relied upon).